United States Patent [19]

Reynolds

[11] Patent Number: 5,437,311
[45] Date of Patent: Aug. 1, 1995

[54] FUEL SYSTEM CONDUIT

[75] Inventor: Kim A. Reynolds, Berwyn, Pa.

[73] Assignee: Markel Corporation, Norristown, Pa.

[21] Appl. No.: 136,340

[22] Filed: Oct. 14, 1993

Related U.S. Application Data

[63] Continuation-in-part of Ser. No. 788,207, Nov. 5, 1991, abandoned.

[51] Int. Cl.$^6$ ............................................. F16L 11/12
[52] U.S. Cl. .................................... 138/115; 138/137; 138/177
[58] Field of Search ............... 138/104, 106, 112, 113, 138/114, 121, 122, 129, 141, 147, 154, DIG. 3, 137, 115, 177

[56] References Cited

U.S. PATENT DOCUMENTS

| Re. 32,230 | 8/1986 | Satoh et al. | 138/126 |
|---|---|---|---|
| 2,624,366 | 1/1953 | Pugh | 138/177 |
| 3,050,786 | 8/1962 | St. John et al. | 18/59 |
| 3,739,459 | 6/1973 | Otani | 138/154 |
| 3,860,040 | 1/1975 | Sullivan | 138/137 |
| 3,981,689 | 9/1976 | Trelease | 138/147 |
| 3,986,732 | 10/1976 | Stanley | 285/134 |
| 4,163,042 | 7/1979 | Lynch | 138/112 |
| 4,163,474 | 8/1979 | MacDonald et al. | 138/112 |
| 4,351,365 | 9/1982 | Bauermeister et al. | 138/149 |
| 4,636,346 | 1/1987 | Gold et al. | 138/109 |
| 4,800,109 | 1/1989 | Washizu | 138/137 |
| 4,802,938 | 2/1989 | Kitami et al. | 138/137 |
| 4,942,906 | 7/1990 | Igarashi et al. | 138/126 |
| 4,982,765 | 1/1991 | Usui | 138/122 |
| 5,005,613 | 4/1991 | Stanley | 141/45 |
| 5,048,572 | 9/1991 | Levine | 138/121 |
| 5,062,456 | 11/1991 | Cooke et al. | 138/125 |

FOREIGN PATENT DOCUMENTS

| 0380763 | 6/1922 | Germany | 138/154 |
|---|---|---|---|

Primary Examiner—David A. Scherbel
Assistant Examiner—James F. Hook
Attorney, Agent, or Firm—Synnestvedt & Lechner

[57] ABSTRACT

Disclosed is an automotive fuel conduit which comprise an inner tube, an outer tube substantially surrounding the inner tube and mechanical locking structure at the interface between the outer surface of the inner tube and the inner surface of the outer tube for preventing substantial relative movement between the inner and outer tubes. The mechanical locking structure preferably comprises a plurality of mating projections and indentations on the inner surface of the outer tube and the outer surface of the inner tube, such as grooves, cuts and ridges. The inner and outer tubes are preferably each formed of polymeric material and each contain both projections and indentations. Methods are also disclosed which comprise providing a first polymeric tubular product having projections and/or indentations in at least a portion of the external surface thereof and melt extruding over said first tubular product a second polymeric tubular product such that the polymeric material of said second tubular product flows into said indentations and/or around said projections during the extrusion process.

16 Claims, 4 Drawing Sheets

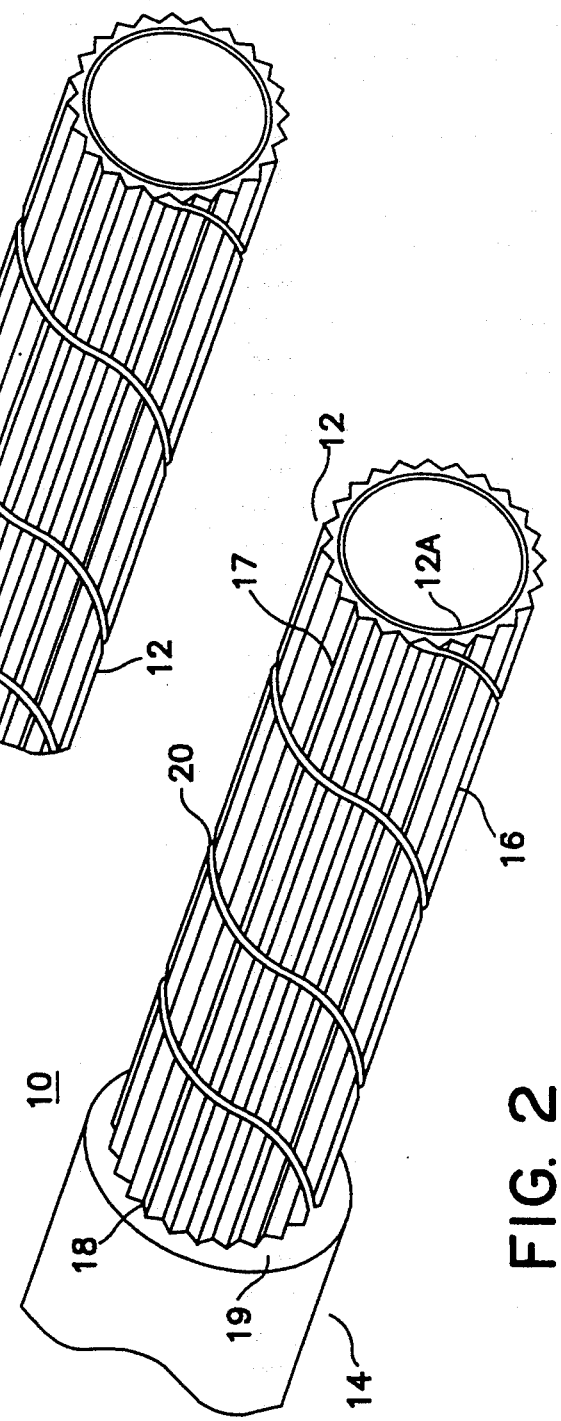

FUEL SYSTEM CONDUIT

This application is a continuation-in-part of copending application Ser. No. 07/788,207, filed on Nov. 5, 1991, now abandoned.

This invention is directed to fuel systems conduits, and more particularly to fuel system conduits having mechanical integrity, exceptional resistance to chemical and heat induced degradation and excellent resistance to vapor permeability.

Conduits for transporting fuel to the engines of cars, buses, boats, airplanes and the like are important components of the fuel delivery systems of such vehicles. Likewise, the conduits which transport fuel vapors are also important components of such fuel delivery systems. These conduits must possess a variety of characteristics and features, not the least of which resistance to vapor permeability and chemical degradation. The need for these features has recently become acute due to increasingly stringent environmental regulations and to the increased emphasis on the development and use of oxygen containing compounds in fuels and fuel additives. Many of these compounds tend to severely degrade the materials heretofore used in fuel system conduits.

One material which possesses exceptional resistance to chemical degradation and vapor permeation is polytetrafluoroethylene (PTFE). Accordingly, such materials are desirable for use as liners in conduits used in fuel delivery systems. However, PTFE and like materials also frequently possess characteristics which make their use in such conduits difficult. For example, fluorocarbon polymers are well known for their "slipperiness," which sometimes makes the construction of a mechanically stable conduit difficult.

U.S. Pat. No. 3,050,786—St. John, et al. relates to conduits lined with PTFE. While this patent recognizes the advantageous futures of such fluorocarbon polymers, it also recognizes their deficiencies:

Although (PTFE) has considerable toughness and can withstand temperatures in normal usage upwards of 200° F., it is still a plastic without mechanical strength available in metals or other non-plastic materials. In view of the above, a need has developed for a satisfactory method of combining (PTFE) with another material having the necessary mechanical strength.

Thus, there has been a long felt need for conduits which incorporate a mechanically stable fluorocarbon inner liner or coating. As explained in the patent to St. John, et al.:

If one were seeking a pipe, for example, having the strength of steel and the chemical inertness of PTFE, the obvious solution would appear to be to line a steel pipe with the resin. Unfortunately, this is more easily said than done. A lining in order to be acceptable must be provided in such a manner that separation from the pipe wall is precluded during the anticipated life of the pipe. As a lining, the material must have sufficient thickness so as to render it impermeable. Considerable difficulty has been encountered in attempting to employ dispersions of PTFE for coating the interior of a pipe. Multiple coats must be applied in order to build up sufficient wall thickness. At the same time, however, a satisfactory method has not been found for perfecting a bond between such a coating and other materials. The alternative method of forcing an outsized liner into a pipe bore cannot be utilized for lengths in excess of a few inches.

The patent to St. John, et al. attempts to overcomes the above-noted difficulties by providing a tube of prestressed, sintered PTFE resin which is dimensionally stable at room temperature but which alters its girth upon heating. In this way, the PTFE tube can be inserted into the outer sheath of the conduit and then heated so as to expand into tight conformity therewith.

While the solution presented by St. John, et al. may prove advantageous in certain applications, applicants have found that such techniques can also have disadvantages. For example, the outer casing to which the PTFE is joined may not itself possess thermal stability at the temperatures required to expand and/or shrink the PTFE resin into conformity therewith. Additionally and importantly, applicants have found that tubular PTFE products, especially thin walled tubular PTFE products, are highly susceptible to kinking and deformation during processing thereof. Such kinking and/or deformation is highly detrimental since it tends to substantially reduce the resistance of the PTFE material to vapor permeation. For this additional reason, therefore, methods of the type disclosed by the St. John et al. patent may be unacceptable due to deformation or kinking the PTFE liner.

Accordingly, it is an object of the present invention to provide fuel system conduits having both mechanical integrity and resistance to chemical degradation.

It is also an object of this invention to provide fuel system conduits having both mechanical integrity and resistance to vapor permeation.

It is a further object of the present invention to provide fuel system conduits having liners comprising fluorocarbon polymer.

It is yet another object of the present invention to provide methods for forming tubular conduits in which the inner plastic liner thereof is not subject to deleterious kinking or deformation during the manufacture thereof.

SUMMARY OF THE INVENTION

Applicants have found that these and other objects are satisfied by fuel system conduits constructed according to the present invention. In particular, applicants have found that advantageous characteristics and features are present in automotive fuel conduits which comprise: an inner tube; an outer tube substantially surrounding the inner tube; and mechanical locking means at the interface between the outer surface of the inner tube and the inner surface of the outer tube for preventing substantial relative movement between the inner and outer tubes. According to preferred embodiments, the mechanical locking means comprises a plurality of mating projections and indentations on the inner surface of the outer tube and the outer surface of the inner tube. For example, in certain embodiments the conduits comprise an inner tube having indentations, such as grooves or cuts, on at least a portion of the outer surface thereof and an outer tube containing projections, such as ridges, at least partially filling the indentations on the outer surface of the inner tube. According to especially preferred embodiments, the inner and outer tubes are each formed of polymeric material and each contain both projections and indentations.

The tubular conduits of the present invention are preferably, although not necessarily, formed according to the methods hereof. In particular, the present methods comprise providing a first tubular product having projections and/or indentations in at least a portion of the external surface thereof and melt extruding over said first tubular product a second polymeric tubular product such that the polymeric material of said second tubular product flows into said indentations and/or around said projections during the extrusion process. In this way, extrusion of the polymeric material over the indentations and/or projections of the inner tube forms a tight, secure mechanical bond between the two tubes without exposing the inner tube to kinking stresses or deformations.

BRIEF DESCRIPTION OF THE FIGURES

FIG. 1 is a perspective view of an inner tube according to one embodiment of the present invention.

FIG. 1A is a view of the tube of FIG. 1 showing the grooves and ridges thereof in enlarged perspective.

FIG. 2 is a partially broken-away perspective view of a fuel line which incorporates the inner tube of FIG. 1.

DETAILED DESCRIPTION OF PREFERRED EMBODIMENTS

I. THE FUEL SYSTEM CONDUITS

Figure 3:
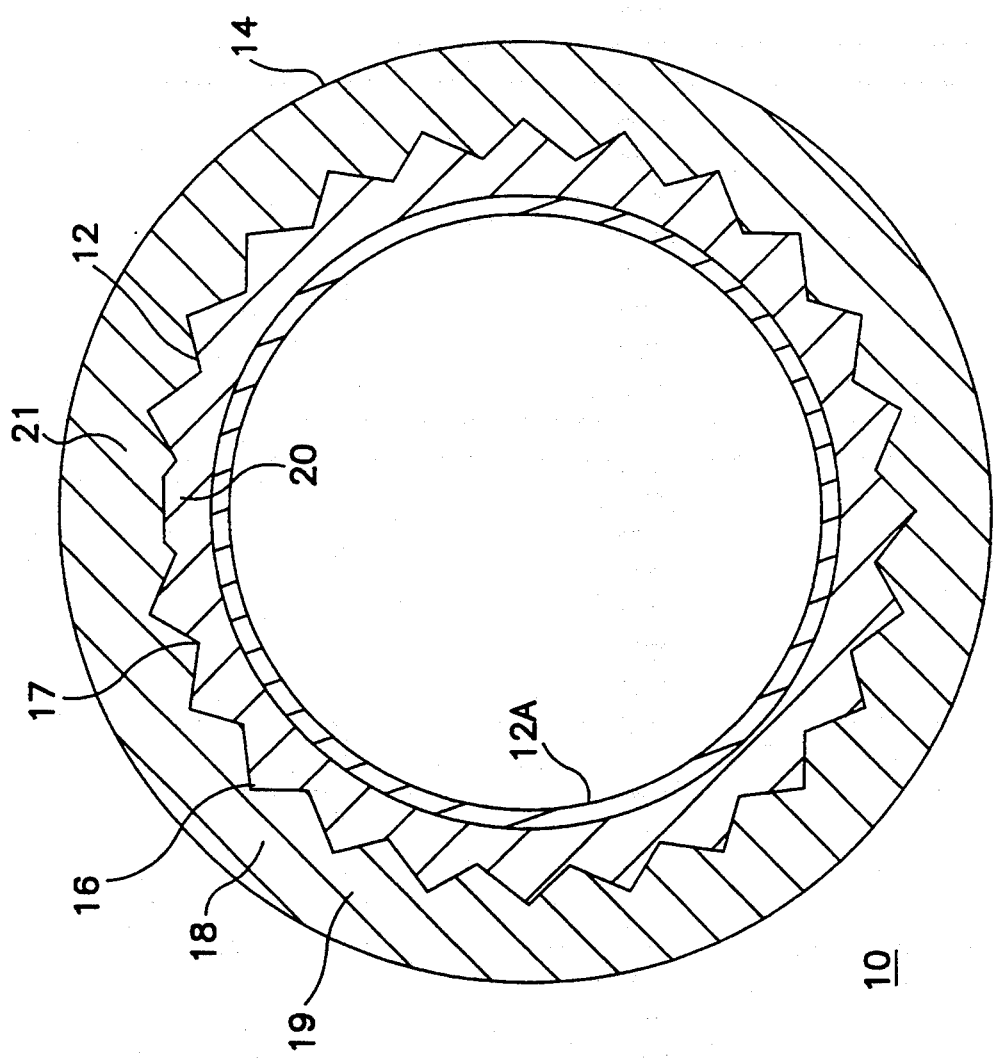
FIG. 3 is a section view of the fuel line of FIG. 1.

The improved fuel system conduit of this invention comprises an inner tube. As will be appreciated by those skilled in the art, the inner tube of the present invention will contain and be in contact with fuel and/or vapor. As a result, the inner tube or liner portions of the present conduits should not only possess flexibility and thermal and chemical stability, but also a high degree of resistance to liquid and vapor permeability. A large number of materials satisfy these requirements and may be used according to certain embodiments of this invention. It is generally preferred, however, that the inner tube or liner of the present conduit comprise a product formed from a resin of fluorocarbon polymer. As is well known, fluorocarbon polymers are a class of paraffinic polymers which have some or all of the hydrogen replaced by fluorine. The inner tubes of the present invention thus are formed from materials comprising fluorocarbon resin selected from group comprised of polytetrafluoroethylene (PTFE), fluorinated ethylene propylene copolymer (FEP), perfluoroalkoxy (PFA) resin, polychlortrifluoroethylene (PCTFE), ethylene-trichlortrifluoroethylene copolymer (ECTFE), ethylene-tetrafluoroethylene copolymer (ETFE), polyvinylidene fluoride (PVDF), polyvinyl fluoride (PVF), and mixtures of one or more of these. While it is contemplated that all of the above fluorocarbon polymers, including homopolymers, copolymers, block and graft copolymers of any of the above, may be used, PTFE resin is preferred.

According to preferred constructions, the inner tube is a composite tube comprised of an outer portion formed of PTFE resin and an inner portion formed of a mixture of PTFE and semiconductive carbon.

The present fuel conduits also comprise a coaxial outer tube. In general, the outer tube preferably contributes to the strength and mechanical stability to the conduit. While many materials are believed to be adaptable for use in forming the outer tube hereof, it is preferred according to certain embodiments that the outer tube comprise a thermoplastic resin. Similarly, although many thermoplastic resins are adaptable for use according to the present invention, it is presently contemplated that polyamide resins will provide especially beneficial results.

According to important and critical aspects of the present invention, the fuel conduits include mechanical locking means, such as projections and indentations which preferably interact such that the inner and outer tubes cannot rotate relative to each other and cannot shift longitudinally with respect to each other. According to preferred embodiments, the locking means comprises a ridge or valley on the outer surface of the inner tube and a mating ridge or valley on the inner surface of the outer tube. In especially preferred embodiments, the ridge or valley extends substantially longitudinally along the exterior and/or interior surfaces of the tubes. Although it is contemplated that a single ridge or valley will provide the locking function required for certain applications, it is preferred that a plurality of longitudinal ridges be provided on the outer surface of the inner tube, with a valley separating each pair of ridges. Of course, the inner surface of the outer tube will have mating ridge and valley portions according to such embodiments. The number of longitudinal ridges may vary, but the inner tube preferably includes from about 10 to about 50 ridges per inch of circumference and, even more preferably from about 10 to about 20 ridges per inch of circumference. Likewise, the precise shape and dimension of the ridges may vary.

It is contemplated that numerous shapes and configurations may be used for the ridges and grooves of the present invention. For example, in certain applications it may be preferred that the ridges comprise sharp peaks and that the valleys comprise sharp troughs. In other embodiments, the valley portions comprise substantially circumferential lands extending between adjacent ridges. For tubes having an inner diameter of from about 0.3 to about 0.4 inch, it is preferred that the thickness of the wall from the inner surface of the tube to about the trough of the valleys be from about 10 to about 50 mil, with the rise of the projection or ridge being on average from about 5 to about 30 mil and even more preferably about 20 to about 25 mil. As the term is used herein, "rise" refers to the furthest radial extent of the projection as measured from the non-ridge surface of the conduit. Thus, the inner tubes of the present invention preferably have a solid wall thickness of from about 10 to about 50 mil and an overall wall thickness, including projections, of from about 15 to about 80 mil.

As will be appreciated, the longitudinal ridges and valleys of the present invention are especially well adapted to prevent or at least inhibit relative rotation between the inner and the outer tubes. In order prevent or inhibit relative longitudinal movement between the inner and the outer tubes, preferred embodiments include a groove or ridge having a structural component which is transverse to the axis of the tube. For the purpose of convenience, such grooves are sometimes referred to herein as "transverse" grooves. Particularly preferred is a spiral groove, valley or cut on the outer surface of the inner tube. Since such a groove, valley or cut has a component thereof which lies transverse to the axis of the tube, it will prevent or inhibit relative longitudinal movement of the tubes upon mating with a corresponding helical or spiral ridge on the inner surface of the outer tube. It will be appreciated that the degree of longitudinal lock according to this embodiment of the invention will depend, at least in part, upon the pitch of the spiral groove or ridge. While large pitch variation is contemplated within the scope of this invention, the inner tubes of the present invention preferably include a single, substantially continuous groove or ridge having a pitch of from about 2 to about 4 turns per inch of tube in the longitudinal direction.

According to especially preferred embodiments, both longitudinal and spiral grooves/ridges are provided. In this way, the locking means of the present invention is provided with a high degree of effectiveness.

A preferred embodiment of the present invention will now be described with reference to the FIGS. 1-3. In particular, FIGS. 1-3 illustrate an improved fuel system conduit, designated generally as 10, in perspective and section views. Conduit 10 preferably comprises PTFE inner tubing 12 and a coaxial polyamide outer tubing 14. As shown in FIGS. 1 and 2, inner tube 12 includes a plurality of parallel ridges 16 separated by valleys or grooves 17, each of which extend longitudinally along the outer surface of inner tube 12. The interior surface of the tube 12 is formed with an inner layer of semiconductive carbon 12A. The semiconductive carbon layer 12A functions as an electrical ground and prevents the creation of potentially hazardous electrical sparks within the line. The outer tubing 14 covers, and preferably substantially surrounds, inner tube 12 and has a plurality of longitudinally extending internal ridges 18 and valleys 19 which mate with valleys 17 and ridges 16 on the outer surface of inner tube 12. The mating and interlocking of the ridges 16 and 18 with valleys 19 and 17, respectively, prevents or substantially inhibits the inner tube 12 from rotating relative to the outer tube 14.

With particular reference to FIGS. 1 and 1A, inner tube 12 of conduit 10 further includes a helical or spiral groove 20. As shown in FIG. 3, a corresponding spiral ridge 21 on the inner surface of the outer tube fills spiral groove 20. It will be observed that the ridges and grooves 16-19 are not continuous along the length of the tubes but rather are segmented by the spiral ridge/groove pair 21/20. This ridge/groove pair 21/20 serve to lock the relative longitudinal positions of inner tube 12 and outer tubes 14, while the longitudinal ridge/groove pairs 16-19 lock the relative rotational position of tubes.

Applicants have thus found a composite inner/outer tube combination in which the beneficial toughness and mechanical strength of the outer tube is effectively transferred to the inner tube. Although applicants do not intend to be bound by or limited to any particular theory of operation, it is believed that the intimate mechanical integration provided by the present invention results in an inner tube which is much less susceptible to the drawbacks heretofore exhibited by, for example, PTFE liners for fuel system conduits. That is, a relatively thin PTFE liner is effectively imparted with the physical ruggedness of the polyamide outer tubing. When the conduit 10 is twisted or turned, for example, the PTFE over tube has a much reduced tendency to kink or crack.

Figure 4:
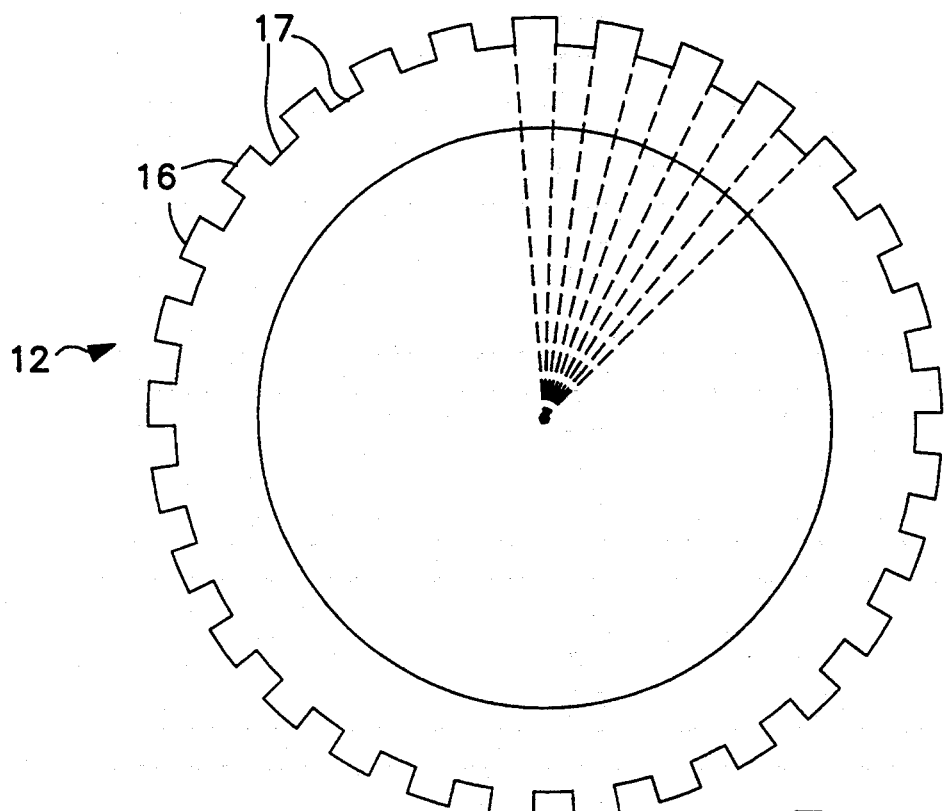
FIG. 4 is a semi-schematic cross-sectional view of an inner tube of the present invention having radial-tooth ridges.
Figure 4A:
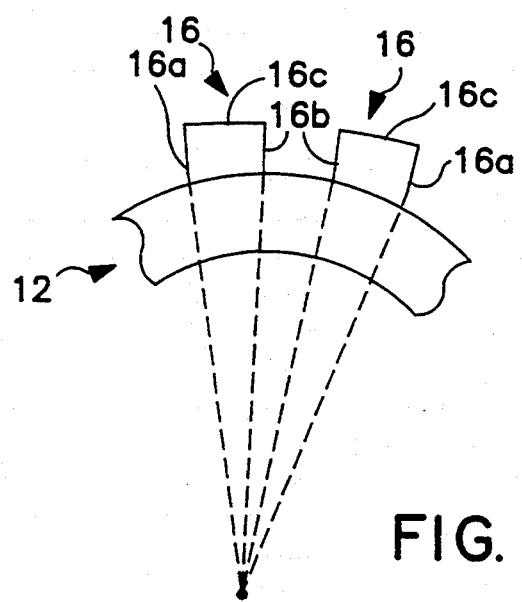
FIG. 4A is a broken-away, semi-schematic cross-sectional enlarged view of the ridges of FIG. 4.

As mentioned hereinbefore, it is contemplated that numerous shapes and dimensions may be beneficially employed for the ridges and grooves according to the present invention. While the longitudinal ridges on the outer surfaces of the inner tube serve primarily to provide for a rotational lock between the inner and outer tubes, applicant has surprisingly and counter-intuitively found that in certain embodiments the shape of such ridges have a significant impact on the effectiveness of the mechanical lock provided by the transverse groove of the present invention. For example, applicant has found that according to certain embodiments the ridge or projection on the outer surface of the inner tube preferably comprises a "radial-tooth" ridge, as illustrated in FIGS. 4 and 4A. As the term is used herein, a "radial-tooth ridge" refers to a ridge having first and second sidewall surfaces 16a and 16b corresponding to separate radii of the inner tube and a substantially flat top wall surface 16c connecting the side-wall surfaces. More generally, the ridges according to certain preferred embodiments have a cross-sectional area which is no less than about 80% of a corresponding radial-tooth ridge, that is, a radial-tooth ridge having the same base dimension and same rise dimension as the ridge in question. For the purposes of convenience, the "base" dimension of a ridge refers to the distance between the sidewall surfaces of the ridge at the point said sidewall surfaces meet the outer surface of the inner tube. According to certain preferred embodiments, the dimension of the top wall is no less than about 80% of the dimension of the base.

Although applicants do not necessarily intend to be bound by or limited to any particular theory of operation, it is believed that the transverse groove of the present invention achieves a more effective lateral lock when ridges of the general type illustrated in FIGS. 4, 4A, 5 and 6 are utilized. This improved effectiveness is believed to result from two features of such ridges. First, ridges of this type generally have a cross-sectional area greater than ridges of the type shown in FIGS. 1-3. In certain embodiments, the greater cross-sectional area provides improved resistance to relative lateral movement between the inner and outer tubes. Additionally, it is believed that the lateral locking groove, that is the transverse groove, may be more precisely cut into or otherwise formed in such projections, thereby permitting cleaner and/or more angular interference points for the prevention of lateral movement.

It is especially preferred that the projections or ridges have first and second sidewalls which are either parallel to one another or diverge with respect to one another, with divergent sidewalls being the more preferred of the two configurations. The utilization of such divergent sidewalls, as shown in FIGS. 4 and 4A, provides the high cross-sectional area described as being advantageous hereinbefore. In addition, applicants have discovered that the use of such divergent sidewalls produces a "undercut" configuration which has the significant benefit of improving the "peel strength" of the present fuel system conduits. More specifically, by providing first and second sidewalls which lie on separate radii of the inner tube, the width of the corresponding grooves on the inner tube will be widest at the base and smallest at the rise. The corresponding ridge on the exterior tube that fills this groove will thus have a top dimension which is greater than the opening provided by adjacent top wall sections of parallel ridges on the inner tube. As a result, therefore, any radial outward force on the exterior tube, that is, "peel away" force, tends to radially deflect and/or radially compress both the exterior ridges on the inner tube and the interior ridges on the exterior tube. The resistance of the plastic material of the ridges to such deflection and/or compressions greatly enhances the peel strength of the present tubes.

Figure 5:
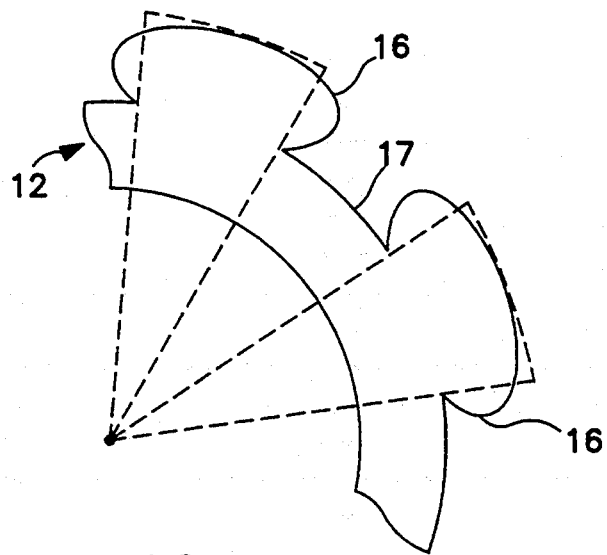
FIG. 5 is a broken-away, semi-schematic cross-sectional view of curved and undercut ridge configurations according to certain embodiments of the present invention.
Figure 6:
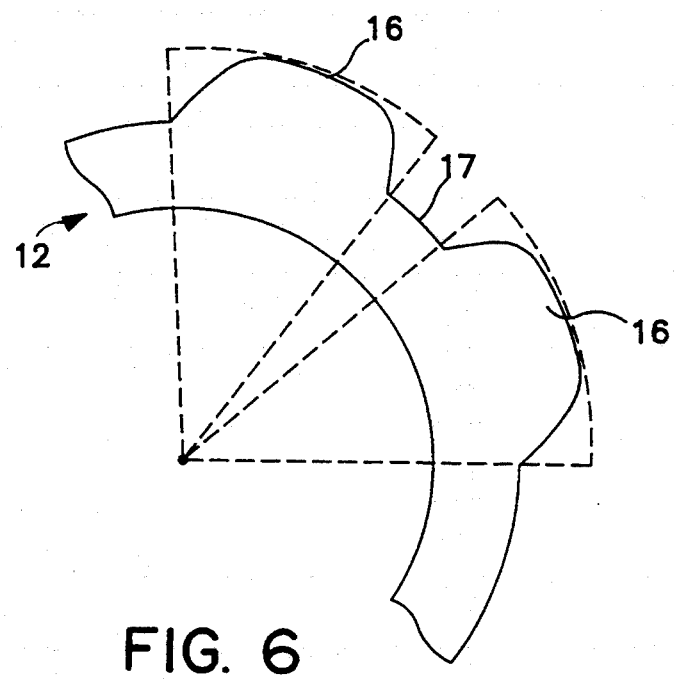
FIG. 6 is a broken-away, semi-schematic cross-sectional view of ridges having a curved wall configuration according to certain embodiments of the present invention.

While the preferred ridges of the present invention are shown in FIGS. 4 and 4A as having substantially flat side and top walls, it will be appreciated by those skilled in the art that the advantages of such ridge components may be achieved using other configurations. For example, ridges having an undercut configuration may be formed using a curved wall surfaces as shown in FIG. 5. Such curved surfaces may also be used to provide preferred ridges which do not have an undercut configuration as shown in FIG. 6.

It will be appreciated that the description of the ridge and groove configuration described hereinbefore applies to both longitudinal grooves and transverse grooves. Thus, for example, a continuous helical or spiral groove may be provided with an undercut configuration.

II. THE METHODS

A preferred method for making the fuel system conduits of the present invention is now described. For the purposes of illustration, the methods will be described in connection with the production of tubular conduits comprising a inner tube comprised of PTFE and an outer tube comprised of polyamide. It will be appreciated, however, that the methods described hereinafter are not exclusive and that other material and methods may used to form the conduits of the present invention.

The fuel conduit 10 is preferably manufactured by providing an inner tube having grooves and/or ridges of the type hereinbefore described on the outer surface thereof. The inner tube is preferably provided by forming a paste extruded PTFE tubular product using any one of a variety of applicable fabricating methods, including various extruding techniques known in the art. For example, powdered PTFE polymer may be compressed into a cylindrical preform. For embodiments in which a semiconductive carbon inner layer is required, the center of the preform may be comprised of semiconductive carbon powders. The PTFE preform is then extruded in typical and known fashion, except that the inner portion of extrusion dye includes a star pattern adapted to impart longitudinal ridges and grooves in the outer surface the tube. The tube may then be further processed, such as by sintering, in known fashion.

The methods also comprise the step of imparting a spiral or helical groove to the outer surface thereof. According to preferred embodiments, the spiral grooves are imparted subsequent to sintering of the longitudinally grooved tube. The spiral grooves are preferably formed by cutting the tube in a spiral fashion. Although numerous techniques may be used in accordance with the present methods, the spiral grooves are preferably formed by passing the sintered tube in a longitudinal direction over a rotating knife. In this way, the pitch of the groove may be altered and regulated by controlling the speed of the tube, the speed of the knife, or a combination thereof.

The methods further require extruding the outer tube, and preferably extruding a thermoplastic resin outer tube, over the longitudinally and spirally grooved/ridged inner tube. As is well known, extrusion of thermoplastic resin typically occurs in a melt process during which the resin is in a relatively fluid, mobile state. Thus, by melt extruding a thermoplastic resin over the inner tube, the resin of the outer tube flows into the grooves and around the ridges on the inner tube. Upon typical subsequent processing, the material of the outer tube crystallizes and/or hardens in and around the grooves and ridges, thereby forming corresponding grooves and ridges in the inner surface of the outer tube.

What is claimed is:

1. An improved fuel system conduit for transporting fuel and/or fuel vapor in an automobile comprising:
    an inner tube comprising fluorocarbon polymeric material and having an inner surface for contacting and containing the fuel or fuel vapor and having an outer surface comprising a plurality of exterior ridges substantially parallel to the longitudinal axis of the tube, said exterior ridges comprising a base, first and second sidewalls that are substantially divergent, and a top wall connected between said first and second sidewalls; and
    an outer tube surrounding and coaxial with the inner tube, said outer tube comprising a thermoplastic polymeric material, the interior surface of said outer tube having interior grooves substantially completely surrounding said exterior ridges such that said inner and outer tubes are mechanically locked together.

2. The conduit of claim 1 wherein the dimension of said top wall is no less than about 80% of the dimension of said base.

3. The conduit of claim 1 wherein said first and second sidewalls each correspond substantially to a different radius of said inner tube.

4. The conduit of claim 1 wherein at least a substantial portion of said ridges are radial tooth ridges.

5. The conduit of claim 1 wherein said inner tube includes an outer surface comprising a spiral groove extending along the outer surface of said tube, said spiral groove comprising first and second sidewalls that are substantially divergent.

6. The conduit of claim 1 wherein said inner tube includes from about 10 to about 15 ridges per inch of circumference of said inner tube.

7. The conduit of claim 1 wherein said inner tube has a solid wall thickness of from about 10 mil to about 50 mil.

8. The conduit of claim 1 wherein said inner tube comprises a paste extruded tubular product.

9. The conduit of claim 1 wherein said fluorocarbon polymeric material comprises PTFE.

10. The conduit of claim 9 wherein said conduit is a vapor return line.

11. The conduit of claim 1 wherein said thermoplastic material comprises polyamide.

12. The conduit of claim 5 wherein said spiral groove has a pitch from about 2 to about 4 turns per inch of tube in the longitudinal direction.

13. The conduit of claim 5 wherein said outer tube includes an inner surface comprising a corresponding spiral ridge extending along the inner surface of said outer tube.

14. An improved fuel system conduit for transporting fuel and/or fuel vapor in an automobile comprising:

an inner tube comprising fluorocarbon polymeric material and having (a) an inner surface for contacting and containing the fuel or fuel vapor and (b) an outer surface comprising (i) a plurality of exterior ridges substantially parallel to the longitudinal axis of the tube, said exterior ridges comprising a base, first and second sidewalls, and a top wall connected between said first and second sidewalls, the cross-sectional area of at least one of said ridges being no less than about 80% of the cross-sectional area of a corresponding radial-tooth ridge; and (ii) a spiral groove extending along the outer surface of said tube, said spiral groove comprising first and second sidewalls that are substantially divergent; and an outer tube surrounding and coaxial with the inner tube, said outer tube comprising a thermoplastic polymeric material, the interior surface of said outer tube having interior grooves substantially completely surrounding said exterior ridges such that said inner and outer tubes are mechanically locked together.

15. The conduit of claim 14 wherein said spiral groove has a pitch from about 2 to about 4 turns per inch of tube in the longitudinal direction.

16. The conduit of claim 14 wherein said outer tube includes an inner surface comprising a corresponding spiral ridge extending along the inner surface of said outer tube.

* * * * *